(12) United States Patent
Okada

(10) Patent No.: US 6,316,051 B2
(45) Date of Patent: *Nov. 13, 2001

(54) PROCESS FOR PRODUCING SILICON CARBIDE FIBER

(75) Inventor: Kaoru Okada, Yokohama (JP)

(73) Assignee: Oji Paper Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,854

(22) Filed: Dec. 21, 1998

(30) Foreign Application Priority Data

Dec. 26, 1997 (JP) .................................................. 9-359722

(51) Int. Cl.$^7$ .................................................. C23C 16/38
(52) U.S. Cl. .................. 427/214; 427/215; 427/249.3; 427/249.4; 427/249.5; 427/249.16; 427/255.27; 427/255.38; 427/255.4; 427/372.2; 427/397.7
(58) Field of Search .................................. 427/214, 215, 427/249.3, 249.4, 249.5, 249.16, 255.27, 255.38, 255.4, 255.7, 372.2, 397.7

(56) References Cited

U.S. PATENT DOCUMENTS

| | | |
|---|---|---|
| 4,908,340 | 3/1990 | Frechette et al. ........................ 501/95 |
| 4,942,011 | 7/1990 | Bolt et al. ............................ 264/29.2 |
| 5,071,600 | 12/1991 | Deleeuw et al. ........................ 264/22 |
| 5,116,679 * | 5/1992 | Nadkarni et al. . |
| 5,279,780 * | 1/1994 | Lipowitz et al. . |
| 5,525,372 * | 6/1996 | Sayles . |
| 5,536,574 * | 7/1996 | Carter . |
| 5,676,918 * | 10/1997 | Okada et al. . |

FOREIGN PATENT DOCUMENTS

| | | |
|---|---|---|
| 0 603 888 | 6/1994 | (EP) . |
| 54-82435 | 6/1979 | (JP) . |
| 2-6615 | 1/1990 | (JP) . |
| 2-255516 | 10/1990 | (JP) . |
| 6-192917 | 7/1994 | (JP) . |
| 6-306710 | 11/1994 | (JP) . |
| 7-97281 | 4/1995 | (JP) . |
| 7-277719 | 10/1995 | (JP) . |
| 9-78358 | 3/1997 | (JP) . |
| 10-53924 | 2/1998 | (JP) . |

OTHER PUBLICATIONS

"The Role of Boron and Carbon in the Sintering of Silicon Carbide," S. Prochazka, Special Ceramic 6, ed. P. Popper, British Ceramic Research Association, Stoke–on–Trent, (1975), pp. 171–181 (no month).

* cited by examiner

Primary Examiner—Timothy Meeks
(74) Attorney, Agent, or Firm—Arent Fox Kintner Plotkin & Khan, PLLC

(57) ABSTRACT

Silicon carbide fibers having an excellent mechanical strength and a superior heat resistance can be produced by the process in which activated carbon fibers having a thickness of 1 to 30 $\mu$m and a BET specific surface area of 700 to 1500 m$^2$/g are reacted with a silicon and/or silicon oxide gas at 1200 to 1500° C. under a reduced pressure or in an inert gas atmosphere; and the resultant SiC fibers are heat treated in the presence of a boron-containing substance and optionally a carbon-containing substance at 1700 to 2300° C. in an inert gas atmosphere, wherein the fibers may be in the form of a shaped article, for example, a sheet or honeycomb structure.

14 Claims, No Drawings

PROCESS FOR PRODUCING SILICON CARBIDE FIBER

BACKGROUND OF THE INVENTION

1. Field of the Invention

The present invention relates to a process for producing silicon carbide fibers. More particularly, the present invention relates to a process for producing silicon carbide fibers having excellent mechanical strength and heat resistance.

2. Description of the Related Art

As a simple process for producing a silicon carbide fiber, Japanese Unexamined Patent Publication No. 6-192,917 discloses a process for preparing a silicon carbide fiber by reacting a porous carbon fiber with a silicon monoxide (SiD) gas at a temperature of 800 to 2000° C.

Also, Japanese Unexamined Patent Publication No. 7-97,281 discloses a process for producing a silicon carbide material having a sheet form structure or three dimensional structure by reacting porous carbon fibers having a specific surface area of 100 to 3000 $m^2/g$ and formed into a sheet form structure or a three dimensional structure, for example, a honeycomb structure, with a silicon monoxide gas at a temperature of 800 to 2000° C.

Further, Japanese Unexamined Patent Publication No. 7-277,719 discloses a process in which porous carbon fibers having a specific surface area of 100 to 2500 $m^2/g$ and formed into a sheet form structure or a three dimensional structure are reacted with a silicon monoxide gas at a temperature of 800 to 2000° C., and then the resultant silicon carbide article in the form of fibers, a sheet or a three dimensional structure is heat-treated in a gas atmosphere comprising nitrogen and substantially no oxygen.

Still further, Japanese Unexamined Patent Publication No. 10-53924 discloses a process for producing a silicon carbide fiber in which process, an activated carbon fiber having a specific surface area of 100 to 2500 $m^2/g$ is reacted with a silicon monoxide gas at a temperature of 800 to 2000° C. under a reduced pressure, and the resultant silicon carbide fiber is coated with a coating containing as a component, a metal oxide. In this process, the metal oxide includes silicon oxide and boron oxide.

This Japanese publication further discloses a process for producing a silicon carbide fiber by reacting an activated carbon fiber with a silicon monoxide gas at a temperature of 800 to 2000° C. under a reduced pressure, heat treating the resultant silicon carbide fiber in an atmosphere containing, as a component, nitrogen at a temperature of 800 to 2000° C., and coating the heat treated silicon carbide fiber with a coating containing, as a component, a metal oxide. In this process, the nitrogen-containing atmosphere is defined to an atmosphere containing, as a component, an nitrogen element-containing gas, for example, a nitrogen gas or ammonia gas, and substantially not containing oxygen.

The above-mentioned prior arts are disadvantageous in that the resultant silicon carbide fiber is unsatisfactory in mechanical strength for composite materials in which the silicon carbide fiber is used as a reinforcing fiber.

Accordingly, there has been a strong demand for a process for producing a silicon carbide fiber having not only a high heat resistance but also a significantly enhanced mechanical strength.

SUMMARY OF THE INVENTION

An object of the present invention is to provide a process for producing silicon carbide fibers having an excellent mechanical strength and a superior heat resistance.

The above-mentioned object can be attained by the process of the present invention, for producing silicon carbide fibers, which comprises the steps of:

reacting activated carbon fibers having a fiber thickness of 1 to 30 μm and a specific surface area of 700 to 1500 $m^2/g$ determined by a BET nitrogen absorption method, with a gas comprising at least one member selected from the group consisting of silicon and silicon oxides, at a temperature of 1200 to 1500° C. under a reduced pressure or in an inert gas atmosphere, to convert the activated carbon fibers to a silicon carbide fibers; and heat-treating the silicon carbide fibers; in the presence of a boron-containing substance at a temperature of 1700 to 2300° C. in an inert gas atmosphere, to enhance the mechanical strength and heat resistance of the silicon carbide fibers.

In the process of the present invention, for producing silicon carbide fibers, preferably, before the heat-treating step, the boron-containing substance is carried on the silicon carbide fibers, and then the boron-containing substance-carrying silicon carbide fibers is subjected to the heat-treating step.

In this embodiment, the boron-containing substance carried on the silicon carbide fibers is preferably in an amount of 0.1 to 50 parts by weight, in terms of boron, per 100 parts by weight of the silicon carbide fibers.

In the process of the present invention for producing silicon fibers, in the heat-treating step, the boron-containing substance may be present in the state of a gas. In this case, the boron-containing substance in the state of a gas is preferably present in an amount of 0.01 to 1% by volume based on the volume of the inert gas.

In the process of the present invention, for producing silicon carbide fibers, the boron-containing substance preferably comprises at least one member selected from the group consisting of boron, boron carbide, borohydrides of alkali metals, borate esters, boron halides, boron hydrides, boric acid and alkali metal borates.

In the process of the present invention for producing silicon carbide fibers, preferably the inert gas for the reaction step and the heat-treating step respectively and independently from each other comprises at least one member selected from argon, helium and neon.

In the process of the present invention for producing silicon carbide fibers, the heat-treating step is preferably carried out in the presence of a carbon-containing substance in addition to the boron-containing substance.

In this case, the carbon-containing substance preferably comprises at least one member selected from carbon, carbon monoxide, carbon dioxide and other carbon compounds which generate at least one member selected from carbon, carbon monoxide and carbon dioxide by being heated in an inert gas atmosphere.

Also, in this case, preferably, before the heat-treating step, the carbon-containing substance is carried on the silicon carbide fibers.

In the process of the present invention for producing silicon carbide fibers, the carbon-containing substance preferably comprises at least one member selected from the group consisting of phenolic resins, carbon black, cellulose and cellulose derivatives.

In this case, the carbon-containing substance carried on the silicon carbide fibers is preferably in an amount of 0.1 to 10% by weight, in terms of carbon, based on the weight of the silicon carbide fibers.

In the process of the present invention for producing silicon carbide fibers, when the heat-treating step is carried out in the presence of a carbon-containing substance, the carbon-containing substance may be in the state of a gas.

In this case, the carbon-containing substance in the state of a gas is preferably present in an amount of 0.01 to 1% by volume, based on the volume of the inert gas.

In the process of the present invention for producing silicon carbide fibers, when the heat-treating step is carried out in the presence of a carbon-containing substance, the carbon-containing substance is preferably present in a weight ratio of carbon element contained in the carbon-containing substance to boron element contained in the boron-containing substance of 0.1:1 to 2.0:1.

In the process of the present invention for producing silicon carbide fiber, the activated carbon fibers are contained in a sheet-like structure or a three-dimensional structure.

DESCRIPTION OF THE PREFERRED EMBODIMENTS

In the process of the present invention, it is essential that silicon carbide fibers converted from an activated carbon fiber having a fiber thickness of 1 to 30 $\mu$m and a specific surface area of 700 to 1500 $m^2/g$ determined by a BET nitrogen absorption method, by reacting the activated carbon fiber with a gas comprising at least one member selected from the group consisting of silicon and silicon oxides, at a temperature of 1200 to 1500° C. under a reduced pressure or in an inert gas atmosphere, are heat-treated in the presence of a boron-containing substance at a temperature of 1700 to 2300° C. in an insert gas atmosphere, to enhance the mechanical strength and heat resistance of the silicon carbide fibers.

The activated carbon fibers may be staple fibers having a length of 0.1 to 50 mm, preferably 1 to 30 mm or continuous filaments having substantially no limit in length, and may be contained in a spun yarn, or multifilament yarn, or in the form of a monofilament. Also, in the process of the present invention, the activated carbon fibers may be contained in a sheet form structure, for example, a paper form sheet, felt form sheet or fabric-form sheet, or a three dimensional structure, for example, a honeycomb, pipe, or three-dimensional weave structure. The above-mentioned yarn, sheet or three dimensional structures comprising a plurality of the activated carbon fibers can be subjected to the reaction with the silicon or silicon oxide-containing gas in accordance with the process of the present invention.

The activated carbon fibers have a thickness of 1 to 30 $\mu$m, preferably 5 to 20 $\mu$m and a specific surface area of 700 to 1500 $m^2/g$, preferably 800 to 1200 $m^2/g$, determined by a BET nitrogen absorption method.

When the thickness of the activated carbon fibers is less than 1 $\mu$m, the resultant activated carbon fiber is difficult to handling. Also, when the thickness is more than 30 $\mu$m, the resultant activated carbon fibers are difficult to uniformly react with a gas containing silicon and/or silicon oxide.

Further, when the specific surface area of the activated carbon fibers is less than 700 $m^2/g$, the conversion of carbon to silicon carbide in the reacting step is insufficiently effected, non-reacted carbon remains in the resultant silicon carbide fiber, and thus the resultant silicon carbide fibers are unsatisfactory in mechanical strength and heat resistance. When the specific surface area of the activated carbon fibers is more than 1500 $m^2/g$, not only the yield of the activated carbon fibers by an activating procedure of a carbon fiber is low, and thus an economical disadvantage occurs, but also the activated carbon fibers have an insufficient mechanical strength and thus the resultant silicon carbide fibers exhibit an unsatisfactory mechanical strength.

The activated carbon fibers usable for the process of the present invention can be produced by conventional activating methods. For example, Japanese Unexamined Patent Publication No. 6-306710 discloses a process in which a pitch prepared from a fossil fuel is formed into carbon fibers, and then the carbon fibers are activated with an activating agent, for example, water vapor or carbon dioxide, to provide an activated carbon fibers.

A plurality of the activated carbon fibers can be formed into a sheet form structure, for example, a sheet or web, by a conventional process as disclosed, for example, in Japanese Unexamined Patent Publication No. 2-255,516. In this process, a pitch is subjected to a melt-spinning procedure to form carbon filaments; the carbon filaments are collected and accumulated to form a web; the resultant carbon filament web is subjected to an infusibilizing procedure; and the infusibilized carbon fibers activated pitch sheet structure is activated. This carbon fiber-producing process can be carried out continuously.

In another activated carbon fiber-producing process, precursor fibers for carbon fibers or carbon fibers are formed into a felt-like sheet by a dry or wet nonwoven sheet-forming method, and then the felt-like precursor or carbon fiber sheet is converted to an activated carbon fiber sheet. Otherwise, a plurality of activated carbon fibers are formed into a sheet, and the resultant activated carbon fiber sheet is used as a starting material for the process of the present invention. Alternatively, a woven fabric is produced from filament yarns or spun yarns of precursory fibers for carbon fibers or carbon fibers, and is converted to an activated carbon fiber woven fabric, or a woven fabric is prepared from activated carbon filaments. The woven fabric of the activated carbon filament yarns or activated carbon fiber spun yarns can be used as a starting material for the process of the present invention.

The three dimensional structure of the activated carbon fibers or filaments can be produced by corrugating the activated carbon fiber or filament sheet or felt or by forming the sheet or felt into a honeycomb structure.

In the process of the present invention the activated carbon fibers are reacted with a reactive gas comprising at least one member selected from silicon and silicon oxides. The reactive gas may be prepared in a gas-generating chamber different from the reaction chamber (heating furnace) and then supplied to the reaction chamber (heating furnace). Alternatively, the reactive gas may be generated in the reaction chamber (heating furnace) by heating plates, blocks or a powder of silicon or silicon oxides in the reaction chamber, and then brought into contact with the activated carbon fiber.

Alternatively, a mixture of the activated carbon fibers with a powder consisting of at least one member selected from silicon and silicon oxides is heated at the above-mentioned specific temperature, to simultaneously effect the generation of the silicon and/or silicon oxide-containing reactive gas and the reaction of the activated carbon fibers with the reactive gas. In this case, after the reaction, the resultant silicon carbide fibers must be separated from the non-reacted silicon and/or silicon oxide-containing powder.

When the sheet structure, for example, a felt or three dimensional structure of the activated carbon fibers is used as a starting material, the sheet or three dimensional structure is impregnated with a silicon and/or silicon oxide-containing powder by using an appropriate dispersing medium, or placed on a layer of the silicon and/or silicon oxide-containing powder, and then the resultant reaction system is heated to convert the activated carbon fibers to silicon carbide fibers.

The silicon and/or silicon oxide-containing powder usable for the process of the present invention is preferably selected from mixed powders of silicon (Si) with silicon dioxide ($SiO_2$), mixed powder of silicon (Si) with silicon monoxide, a solid silicon monoxide (SiO) powder, a silicon powder, and mixed powders of carbon (C) with silicon dioxide ($SiO_2$). Among these powders, the mixed powders of silicon (Si) with solid silicon monoxide (SiO), the mixed powders of silicon with silicon dioxide ($SiO_2$) and the solid silicon monoxide powder which are easily available and relatively cheap, are preferred for the process of the present invention. The solid silicon monoxide can be selected from trade silicon monoxide for deposition (for example, made by SUMITOMO STICKS CO.).

When the silicon and/or silicon oxide-containing powder is heated at a temperature of 1200 to 1500° C. under a reduced pressure or in an inert gas atmosphere, a reactive gas containing silicon (Si) and/or silicon oxides ($SiO_x$) is generated and reacted with the activated carbon fiber, to convert the activated carbon fiber to silicon carbide fiber.

When a mixture of a silicon powder with a silicon dioxide powder is used, a reactive gas containing silicon (Si) and silicon oxides ($SiO_x$) can be generated with an enhanced efficiency. In this case, the silicon powder and the silicon dioxide powder are preferably used in a molar ratio of 1:0.1 to 1:2, more preferably 1:0.5 to 1:1.5. When the molar ratio of silicon to silicon dioxide is more than 1:0.1, the activation effect of silicon dioxide to silicon may be insufficient. Also, when the molar ratio is less than 1:2, the activation effect may be saturated and thus an economical disadvantage may occur.

The silicon and/or silicon oxide-containing powder is preferably used in an amount of 1.2 to 20 times, more preferably 1.5 to 10 times, still more preferably 2.0 to 3.0 times, the dry weight of the activated carbon fibers. When the weight ratio of the dry weight of the silicon and/or silicon oxide-containing powder to the dry weight of the activated carbon fibers is less than 1.2/1, the silicon carbide-producing reaction may not be fully effected, and thus the resultant silicon carbide fibers may be unsatisfactory in the target properties. Also, the wight ratio is more than 20/1, non-reacted silicon and/or silicon oxide-containing powder may remain in too large an amount in the reaction system, and thus an economical disadvantage may occur.

The mixture of the activated carbon fibers with the silicon and/or silicon oxide-containing powder, prepared in the above-mentioned manner, is heated to convert the activated carbon fibers to the silicon carbide fibers. There is no limitation to the type of the furnace for the reacting step, as long as the activated carbon fibers can be sufficiently heated and fully converted to silicon carbide fibers in the inert gas atmosphere or under a reduced pressure, usually the heating furnace usable for the reaction step of the process of the present invention is selected from conventional tube type furnaces, tunnel type furnaces, box-formed furnaces, kilns, convertors, and fulidized bed furnaces.

The reaction is carried out in an inert gas atmosphere or under a reduced pressure.

The inert gas atmosphere usable for the reacting step of the process of the present invention preferably consists essentially of at least one member selected from helium, argon and neon gasses. The inert gas atmosphere preferably contains oxygen in a limited amount of 0.001% by volume or less, and nitrogen in a limited amount of 1% by volume or less.

In the reacting step, the inert gas preferably flows at a flow rate of 10 to 300 liters/minute, more preferably 50 to 200 liters/minute per kg of the total amount of the reaction mixture consisting of the activated carbon fibers and the silicon and/or silicon oxide-containing powder, through the reaction system. When the flow rate of the inert gas is less than 10 liters/minute per kg of the total amount of the reaction mixture, a by-product gas generated by the reaction of the reaction mixture is not fully removed and thus is accumulated in the reaction system. Also, when the flow rate is more than 300 liters/minute per kg of the reaction mixture, a portion of the silicon and/or silicon oxide-containing gas generated in the reaction system is delivered from the reaction system, without contributing to the silicon carbide fiber-producing reaction, and thus the silicon carbide fiber-forming reaction is carried out insufficiently.

When the reacting step of the process of the present invention is carried out in the inert gas atmosphere, the reaction can be fully carried out under a pressure preferably in the range of from the ambient atmospheric pressure to 1, 2 times the ambient atmospheric pressure, for example, one atmosphere. More preferably, the inert gas atmosphere pressure in the reacting system is controlled to slightly higher than the ambient atmospheric pressure, to prevent an invasion of the atmospheric air into the reacting system.

When the reacting step is carried out under a reduced pressure, the reduced reaction pressure is preferably controlled to 1 to $10^3$ Pa to prevent a deviation of the reaction result.

In the reacting step, the reaction system is preferably heated at a heating rate of 50 to 1500° C./hr to a desired temperature. In the temperature-rising procedure, preferably, the temperature-rising procedure is stopped at a temperature of 700° C. to 1100° C., the temperature of the reacting system is maintained at this level for a fixed time, for example, 30 minutes to 5 hours, and then the reacting system is further heated to a desired level. This type of heating procedure contributes to preventing the formation of whiskers and to enhancing the efficiency of the conversion of the activated carbon fibers to the silicon carbide fibers.

The whiskers consist of a thin fiber-formed crystalline substance consisting of silicon carbide (SiC) and having a diameter (thickness of 0.5 to 1 µm and an aspect ratio of 20 to 100. Since the whiskers are too thin and too short, they cannot be employed as usual fibers.

In the process of present invention the formation of the whiskers as a by-product must be prevented to the utmost, and thus, before the silicon carbide fiber-producing reaction, carbon and other volatile substances contained in the activated carbon fibers must be removed by heating. For this purpose, the activated carbon fibers and the silicon and/or silicon oxide-containing powder are preferably pre-heated separately or altogether, before the silicon carbide fiber-producing reaction. In the present invention, the reaction system must be free from catalyst for the whisker-production.

In the reacting step of the process of the present invention, the activated carbon fibers and the silicon and/or silicon oxide-containing powder or a mixture thereof with each other are heated to a temperature of 1200 to 1500° C., preferably 1300 to 1450° C., more preferably 1350 to 1430°

C., and are maintained at this temperature for a fixed time, for example, 30 minutes to 10 hours. When the reaction temperature is less than 1200° C., the reaction of the activated carbon fibers with the silicon-containing gas generated from the silicon and/or silicon oxide-containing powder can not be fully effected, and thus resultant silicon carbide fibers exhibit unsatisfactory heat resistance and mechanical strength. Also, when the reaction temperature is more than 1500° C., the silicon and/or silicon oxide-containing powder is melt-agglomerated and adhered to the resultant silicon carbide fibers. Therefore, after the reaction, the resultant silicon carbide fibers are difficult to separate from the remaining silicon and/or silicon oxide-containing agglomerates.

The reaction time at the reaction temperature of 1200 to 1500° C. is variable in response to the reaction temperature. The higher the reaction temperature, the shorter the reaction time. Usually, the reaction time is 10 minutes to 10 hours, preferably 1 to 5 hours. When the reaction time is less than 10 minutes, the silicon carbide fiber-producing reaction may not be fully effected, and when the reaction time is more than 10 hours, not only the reaction is saturated and an unnecessary amount of energy is consumed, but also, undesirable crystals of silicon carbide grow in the silicon carbide fibers to cause the resultant silicon carbide fibers to exhibit a decreased mechanical strength.

After the completion of the silicon carbide fiber-producing reaction, the resultant silicon carbide fibers are cooled to room temperature. There is no limitation to the cooling rate.

The silicon carbide fibers produced by the reacting step of the process of the present invention can be directly subjected to the heat-treating step in the presence of a boron-containing substance in an inert gas atmosphere. However, if the resultant silicon carbide fibers contain oxygen in a content of about 5 to 10% by weight of oxygen, the silicon carbide fibers may be pre-treated to reduce the oxygen content and to enhance the mechanical strength-increasing effect of the heat-treating step.

The pre-treatment for reducing the oxygen content of the silicon carbide fibers can be effected by a conventional method, for example, a washing of the silicon carbide fibers with a hydrofluoric acid, a heating of the silicon carbide fibers in a reducing gas atmosphere, for example, a hydrogen and/or carbon monoxide gas atmosphere. By reducing the oxygen content of the silicon carbide fibers to 5% by weight or less by the above-mentioned pre-treatment, the heat-treating step of the process of the present invention can exhibit an enhanced mechanical strength-increasing effect for the silicon carbide fibers.

The silicon carbide fibers produced by the reacting step and optionally the oxygen content-reducing pre-treatment may have an insufficient mechanical strength for certain uses. The reasons for the insufficient mechanical strength of the silicon carbide fibers has not been fully clarified. However, it is assumed that the insufficient mechanical strength is derived from an insufficient density of the silicon carbide fibers. Namely, it is assumed that when the activated carbon fibers are converted to silicon carbide fibers, the fine pores in the activated carbon fibers are incompletely filled, and the remaining fine pores causes the resultant silicon carbide fibers to exhibit an unsatisfactory mechanical strength.

Accordingly, the mechanical strength of the silicon carbide fibers converted from the activated carbon fibers can be increased by filling the fine pores (namely by decreasing the number of the fine pores and/or by making the size of the fine pores smaller). However, in fact, it is very difficult to remove the fine pores in the silicon carbide fibers without losing the other properties of the silicon carbide fibers. The inventors of the present invention have made various attempts to remove the fine pores from the silicon carbide fibers and as a result, have found that the fine structure of the silicon carbide fiber can be made more dense by heat treating them in the presence of a boron-containing substance in an inert gas atmosphere at a temperature of 1700 to 2300° C. Also it has found that the very dense structure causes the silicon carbide fibers to exhibit a significantly enhanced mechanical strength.

It is known that in a process for producing a ceramic material by forming a shaped article from a silicon carbide powder and sintering the shaped article, the sintering can be promoted by adding a boron-containing substance to the silicon carbide powder. For example, Prochazca, S., "Special Ceramics 6," ed. P. Popper, British Ceramic Research Association, Stoke-on-Trent (1975), Pages 171 to 182, report that when the silicon carbide powder is mixed with carbon and boron, the mixture is press-formed, and the formed article is heated in an inert gas atmosphere at a temperature of 2040° C., the resultant sintered article exhibits a real density corresponding 95 to 98% of the theoretical density thereof. This report is concerned only with the sintering method of silicon carbide powder but not with the enhancement of the mechanical strength of silicon carbide fibers.

With respect to a production of silicon carbide fibers using a boron compound, Japanese Unexamined Patent Publication No. 9-78,358 discloses a process for producing ceramic fibers with a high heat resistance by melt-spinning a polytitanocarbosilane into fibers; infusibilizing the polytitanocarbosilane fibers; first heat-treating the infusible polytitanocarbosilane fibers in an inert gas atmosphere at a temperature of 1200 to 1450° C. to convert them to inorganic material fibers; secondly heat-treating the inorganic material fibers in a boron-containing atmosphere at a temperature of 1200° C. to 1450° C.; and then thirdly heat-treating the second heat-treated fibers in an argon gas atmosphere at a temperature of 1700° C. to 2100° C.

Also, Japanese Unexamined Patent Publication No. 54-82,435 discloses a process for producing SiC fibers by mixing and polymerizing a polysilane with a polyborosiloxane; melt-spinning the resultant polymer containing, as a main component, polycarbosilane; infusibilizing the resultant fibers; and heat-treating the infusibilized fibers under vacuum or in an inert gas atmosphere at a temperature of 800 to 1800° C.

Also U.S. Pat. No. 4,908,340 discloses a process for producing silicon carbide fibers by heat-kneading a mixture of a non-oxide type ceramic powder, for example, a silicon carbide powder, with a sintering assistant, for example, $B_4C$, a phenol resin, a polyethylene resin or an oleic acid; melt-spinning the mixture; and heat-treating the resultant fibers in a nitrogen or argon gas atmosphere at a temperature of 2000 to 2300° C.

Further, U.S. Pat. No. 5,071,600 discloses a process for producing silicon carbide fibers by melt-spinning a mixture of a polycarbosilane with boron; or by treating polycarbosilane fibers with a gas containing a boron-containing substance, for example, diborane, at a temperature of 25 to 200° C.; and then heat-treating the resultant treated fibers in an inert gas atmosphere at a temperature of 1600° C. or more, preferably 1800 to 1850° C.

Further, Japanese Unexamined Patent Publication No. 2-6,615 discloses a process for producing silicon carbide fibers by dissolving or dispersing α-silicon carbide, a dispersing assistant, $B_4C$ and a polycarbosilane in xylene; extrude-spinning the resultant solution or dispersion, and heat-treating the resultant fibers in argon gas atmosphere at a temperature of 2000° C.

However, none of the above-mentioned prior arts teaches or suggests the silicon carbide fibers of the present invention produced by reacting activated carbon fibers with a gas generated from silicon and/or silicon oxides under a reduced pressure or in an inert gas atmosphere at a high temperature.

In the process of the present invention, the silicon carbide fibers prepared by reacting activated carbon fibers having a fiber thickness of 1 to 30 μm and a specific surface area of 700 to 1500 $m^2/g$ determined by a BET nitrogen absorption method, with a gas comprising at least one member selected from the group consisting of silicon and silicon oxides, at a temperature of 1200 to 1500° C. under a reduced pressure or in an inert gas atmosphere, are heat-treated in the presence of a boron-containing substance at a temperature of 1700 to 2300° C. in an insert gas atmosphere, to enhance the mechanical strength and heat resistance of the silicon carbide fibers.

This specific heat-treating step is new and contributes to increasing the fine structure density of the resultant silicon carbide fibers and to enhancing the mechanical strength of the silicon carbide fibers.

To provide a heat-treatment system containing the silicon carbide fibers and inert gas atmosphere in which a boron-containing substance is present, the boron-containing substance can be supplied to the heat-treatment system by carrying the boron-containing substance on the silicon carbide fibers produced by the reacting step of the process of the present invention. The boron-containing substance preferably comprises at least one member selected from amorphous and crystalline boron simple substances, boron carbonate, tetrahydroborates of alkali metals, for example, lithium tetrahydroborate, borohydrides of alkali metals, for example, lithium borohydride and sodium borohydride, borate esters, for example, ethyl borate and methyl borate, boron halides, for example, boron trichlorides and boron trifluorides, boron hydrides, for example, diborane and pentaborane, boric acid and borates of alkali metals. Among these boron-containing substances, the amorphous and crystalline boron simple substances, boron carbonate and lithium borohydride are more preferably employed for the process of the present invention.

There is no limitation to the procedures for carrying the boron-containing substance on the silicon carbide fibers. For example, in the case where the boron-containing substance comprises boron (simple substance) and/or boron carbide which is in the state of a solid at room temperature and for which no solvent capable of dissolving therein at room temperature is found, the boron (simple substance) and/or boron carbide is pulverized into fine particles having a particle size of 0.1 to 10 μm, the fine particles are dispersed in a liquid medium, for example, water or ethyl alcohol, and the dispersion of the fine particles of the insoluble boron and/or boron carbide is impregnated in the silicate carbide fibers and dried to carry the fine particles on the silicon carbide fiber peripheries.

In this case, the dispersion preferably has a content of the insoluble boron-containing substance of 0.01 to 10% by weight, more preferably 0.1 to 5% by weight. When the content of the insoluble boron-containing substance in the dispersion is less than 0.01% by weight, the boron-containing substance may not be carried in an insufficient amount on the silicon carbide fibers, and as a result, the effect of the boron-containing substance for enhancing the mechanical strength and the heat resistance of the silicon carbide fibers may be insufficient. Also, when the content of the insoluble boron-containing substance is more than 10% by weight, the boron-containing substance particles may be unevenly distributed on the peripheries of the silicon carbide fibers, and thus the mechanical strength and heat resistance-enhancing effect may be very unevenly exhibited on the silicon carbide fibers.

Also, in the case where a boron-containing substance soluble in a solvent at room temperature, for example, lithium boronhydride, is carried on the silicon carbide fibers, preferably, the boron-containing substance is dissolved in a certain solvent, and the resultant solution is impregnated in the silicon carbide fibers. In this case, the content of the soluble boron-containing substance in the solution is preferably 0.01 to 10% by weight, more preferably 0.1 to 5% by weight, which is the same as that for the insoluble boron-containing substance.

When the content of the soluble boron-containing substance in the solution is less than 0.01% by weight, the boron-containing substance may be carried, in an insufficient amount, on the silicon carbide fibers, and thus a satisfactory mechanical strength and heat resistance-enhancing effect may not be obtained for the silicon carbide fibers. Also, when the boron-containing substance content is more than 10% by weight, the boron-containing substance may be unevenly carried on the silicon carbide fibers and thus the mechanical strength and heat resistance-enhancing effect on the silicon carbide fibers may be unevenly realized.

When the boron-containing substance is carried on the silicon carbide fibers to enhance the mechanical strength and the heat resistance by the heat treatment, optionally a carbon-containing substance is added in an amount, in terms of carbon, of 0.1 to 2.0 times the amount of boron contained in the boron-containing substance, to the boron-containing substance. The addition of the carbon-containing substance may be carried out by mixing a fine carbon powder, for example, carbon black powder, into the boron-containing substance powder, or by dissolving or dispersing a carbon-containing substance capable of generating carbon therefrom, for example, a phenol resin, when heated in an inert gas atmosphere, into a solution or dispersion of the boron-containing substance.

In the process of the present invention the silicon carbide fibers impregnated with a solution or dispersion of the boron-containing substance or the mixture of the boron-containing substance with the carbon-containing substance, is subjected to a liquid-removing procedure by which an excessive amount of the solution or dispersion is removed by a centrifugal treatment or a suction-filtering treatment, and then the solvent medium is removed by drying.

If the dried boron-containing substance and optional carbon-containing substance are easily removed from the silicon carbide fibers after the solvent medium is removed, a suitable binder is preferably added to the solution or dispersion during the preparation thereof. The binder is preferably selected from acrylic resins and polyvinyl alcohol. The binder is preferably employed in an amount of 0.1 to 1.0% by weight based on the amount of the solvent medium.

The boron-containing substance carried on the silicon carbide fibers is preferably in an amount of 0.1 to 50 parts by weight, more preferably 1 to 10 parts by weight, in terms of boron (simple substance), per 100 parts by weight of the silicon carbide fibers.

When the dry amount of the boron-containing substance carried on the silicon carbide fibers is less than 0.1 part by weight, in terms of boron, the mechanical strength and heat resistance-enhancing effect for the silicon carbide fibers by the heat treatment may be unsatisfactory. Also, when the amount of the boron-containing substance carried on the silicon carbide fibers is more than 50 parts by weight in terms of boron, the distribution of the boron-containing substance on the silicon carbide fibers may be uneven and thus the resultant heat-treated silicon carbide fibers may be uneven in the mechanical strength and heat resistance-enhancing effect.

The carbon-containing substance carried on the silicon carbide fibers is preferably in an amount of 0.1 to 10%, more preferably 0.5 to 5% by weight, in terms of carbon, based on the weight of the silicon carbide fibers.

The silicon carbide fibers carrying thereon the boron-containing substance and obtained by the above-mentioned procedures are heat-treated in an inert gas atmosphere at a temperature of 1700 to 2300° C.

In another method for feeding the boron-containing substance to the heat-treatment system, a boron-containing substance in the state of a gas is fed into the inert gas atmosphere. When this method is utilized, it is unnecessary that the boron-containing substance is carried on the silicon carbide fibers. The boron-containing substance capable of gasifying includes boron halides, for example, boron trichloride and boron trifluoride; boron hydride, for example, diborane and pentaborane, and boric acid. The gasified boron-containing substance is preferably contained in an amount of 0.01 to 1% by volume based on the volume of the inert gas.

When this method is utilized, an addition of a carbon-containing substance to the gasified boron-containing substance is advantageous in that the mechanical strength and the heat existence of the resultant heat-treated silicon carbide fibers are further enhanced. As a method of adding a carbon-containing substance, a carbon compound, for example, carbon monoxide and carbon dioxide which are in the state of a gas under the ambient atmospheric conditions, is fed together with the gasified boron-containing substance to the inert atmosphere. The carbon-containing substance in the state of a gas is preferably present in an amount of 0.01 to 1% by volume based on the volume of the inert gas.

In another method of feeding the carbon-containing substance, a fine particulate carbon, for example, a carbon black powder are carried on the silicon carbide fibers, or an organic compound, for example, a phenol resin, capable of generating carbon simple substance when heated in the inert gas atmosphere is carried on the silicon carbide fibers, for example, by impregnation. In this case, the carbon compound to be carried on the silicon carbide fibers is preferably in an amount of 0.1 to 2.0 times the weight of boron contained in the gasified boron-containing substance fed into the inert gas atmosphere.

In the heat-treatment step of the process of the present invention, the inert gas atmosphere comprises at least one member selected from inert rare gases, for example, helium, argon and neon. Particularly, the inert gas comprising helium and/or argon is useful for the heat treatment of the process of the present invention. Preferably, the inert gas is substantially free from oxygen and nitrogen. The content of impurities in the inert gas is preferably limited to 0.1% by volume or less.

In practice of the heat treatment in the inert gas atmosphere, the silicon carbide fibers are heated while continuously passing the inert gas under the ambient atmospheric pressure (1 atmosphere, $1.01 \times 10^5$ Pa) through the heat-treatment system in the presence of the boron-containing substance and optionally the carbon-containing substance. The inert gas flow rate is variable in response to the amount of the silicon carbide fibers and the capacity of the heat-treatment apparatus. For example, when the silicon carbide fibers carrying a boron-containing substance thereon is placed in an amount of 10 g in a heat treatment furnace having an inner capacity of 5 liters, preferably, the inert gas is passed at a flow rate of 1 to 2 liters/minute through the furnace.

In the heat-treating step for the silicon carbide fibers in the inert gas atmosphere, the heating rate is preferably 5 to 100° C./minute, more preferably 10 to 50° C./minute when a batch type heating furnace is used, and the furnace temperature is rised to a heat treatment temperature of 1700 to 2300° C. and maintained at this temperature for a time necessary to complete the heat treatment. The heat treatment temperature is 1700 to 2300° C., preferably 1900 to 2200° C., more preferably 2000 to 2150° C. When the heat treatment temperature is lower than 1700° C., a satisfactory enhancement effects on the mechanical strength and the heat resistance of the silicon carbide fibers cannot be obtained even when the heat treatment time is fully extended. Also, when the heat treatment temperature is more than 2300° C., the silicone carbide fibers are compressed and the mechanical strength of the fibers is significantly decreased.

After the heat treatment temperature of the furnace reaches to a target highest temperature within the range of from 1700 to 2300° C., the heat treatment temperature is maintained at this level for a desired time. The heat treatment time is variable depending on the highest heat treatment temperature. For example, when the heat treatment temperature is maintained at a level of 2000° C., the heat treatment time is preferably 1 to 60 minutes. When the heat treatment time is too short, the enhancement effect on the mechanical strength and the heat resistance of the silicon carbide fibers by the heat treatment is unsatisfactory. Also, when the heat treatment time is too long, the silicon carbide fibers may be decomposed or excessively crystallized, thus the mechanical strength of the fibers is decreased, and an economical disadvantage may occur.

The furnace for the heat treatment of the present invention must have a sufficient heat resistance to the heating at a temperature of 1700 to 2300° C. in an inert gas atmosphere. Therefore, at least portions which are exposed to the above-mentioned high temperature are preferably formed from heat-resistant materials, for example, carbon, molybdenum and/or tungsten.

After the heat treatment temperature is maintained at a target highest level for a necessary time, the heat-treated silicon carbide fibers are cooled, so that the fibers are not exposed to the high temperature over an unnecessary long time. The cooling rate is preferably 10 to 500° C./minute, more preferably 50 to 100° C./minute. After the cooled fibers reaches 1600° C. or less, the cooling rate is not restricted to a specific range. However, in the cooling procedure, until the temperature of the silicon carbide fibers passes through a level of 1300° C., the silicon carbide fibers must be held in the inert gas atmosphere.

EXAMPLES

The present invention will be further explained in detail by the following examples which are merely representative and do not restrict the scope of the present invention in any way.

Example 1

Activated carbon fibers (Linobeth® A-10, made by Osaka Gas K.K.) produced from pitch and having a fiber length of 6 mm, a specific surface area of 1000 m$^2$/g and a fiber thickness of 13 μm were dried in an air blast dryer at a temperature of 120° C. for 5 hours. Separately, 100 g of a silicon powder (first grade reagent, made by WAKO JUNYAKUKYOGYO K.K.) were fully mixed with 215 g of a silicon dioxide powder (first grade reagent, made by WAKO JUNYAKUKOGYO K.K.) in a mortar. The resultant silicon-silicon dioxide were fully mixed with 50 g of the dried activated carbon fibers. The resultant activated carbon fiber mixture was packed in a mullite furnace core tube having an inner diameter of 70 mm, and contained in a tube-formed furnace, to a length of 400 mm. The inside of the core tube is heated from room temperature to a temperature of 900° C. over a time of 3 hours, maintained at 900° C. for 3 hours, further heated to a temperature of 1400° C. over a time of 2 hours, maintained at 1400° C. for 4 hours, and cooled to room temperature over a time of 5 hours, while passing an argon gas (having a degree of purity of 99.99% by volume) through the core tube of the furnace at a flow rate of 10 liters 1 minute. After the cooling, the mixture of the resultant fibers and the non-reacted residual powder is taken up from the core tube of the furnace, and dispersed in 30 liters of water by using an agitator (Agitar®, made by SIMAZAKI K.K.), to separate the silicon carbide fibers from the residual powder. The resultant fiber-containing aqueous dispersion was filtered through a sieve having an opening size of 149 μm. The remaining fibers on the sieve was rinsed with flowing water.

The rinsed fibers were collected and dried in an air blast dryer at a temperature of 120° C. for 5 hours. The dried fibers weighed 60 g. The fibers were subjected to a scanning electron micropic observation and to an X-ray diffraction analysis. As a result, it was confirmed that the resultant fibers consist of silicon carbide. The thickness and length of the silicon carbide fibers are substantially the same as those of the starting activated carbon fibers.

The silicon carbide fibers in an amount of 1.00 g were immersed in 100 g of a dispersion of 1 g of boron (reagent grade, amorphous, made by WAKO JUNYAKUKOGYO K.K.) in 99 g of methyl alcohol for 5 minutes, and removed from the dispersion and filtered by a Buchner funnel under suction to remove the excessive amount of the dispersion from the fiber. The filtered fibers were dried in an air blast dryer at a temperature of 105° C. for 3 hours. The weight of the dried fibers was 1.07 g.

The boron-impregnated silicon carbide fibers in an amount of 1.00 g were placed in a Tammann furnace equipped with a graphite heat-generating tube having an inner diameter of 50 mm, heated from room temperature to 1000° C. over a time of 30 minutes, and then to 2000° C. over a time of 30 minutes. After reached 2000° C., the furnace temperature was maintained at 2000° C. for one minute, and then cooled to 1700° C. over a time of 2 minutes. Further, the furnace temperature was cooled to room temperature over a time of 2 hours, and then the cooled fibers were removed from the furnace. The above-mentioned heat treatment was carried out while passing an argon gas (having a degree of purity of 99.9% by volume) at a flow rate of 2.0 liters/minute through the furnace. The resultant heat treated fibers had a weight of 0.91 g.

As a result of a scanning electron microscopic observation of the cross-sections of the heat-treated silicon carbide fibers, it was confirmed that the resultant fibers had a more dense structure, substantially free from pores, than that of the non-boron-carrying and non-heat treated silicon carbide fibers, and thus the sintering of silicon carbide occurred.

Comparative Example 1

Silicon carbide fibers heat-treated in the presence of a boron-containing substance were produced by the same procedures as in Example 1, with the following exceptions.

After the silicon carbide fibers were prepared from the activated carbon fibers and carried with boron by the same procedures as in Example 1, the resultant boron-carrying silicon carbide fibers in an amount of 1.00 g were placed in a Tammann furnace equipped with a graphite heat-generating tube having an inner diameter of 50 mm, heated from room temperature to 1000° C. over a time of 30 minutes, and then to 1600° C. over a time of 18 minutes. After reached 1600° C., the furnace temperature was maintained at 1600° C. for 60 minutes, and then cooled to room temperature over a time of 2 hours. Then, the cooled fibers were removed from the furnace. The above-mentioned heat treatment was carried out while passing an argon gas (having a degree of purity of 99.9% by volume) at a flow rate of 2.0 liters/minute through the furnace. The resultant heat treated fibers had a weight of 0.96 g.

As a result of a scanning electron microscopic observation of the cross-sections of the heat-treated silicon carbide fibers, it was confirmed that the resultant fibers had the same fine structure as that of the silicon carbide fibers not heat-treated at a temperature of 1600° C., and thus no sintering of silicon carbide occurred.

Comparative Example 2

Silicon carbide fibers heat-treated in the presence of a boron-containing substance were produced by the same procedures as in Example 1, with the following exceptions.

After the silicon carbide fibers were prepared from the activated carbon fibers and carried with boron by the same procedures as in Example 1, the resultant boron-carrying silicon carbide fibers in an amount of 1.00 g were placed in a Tammann furnace equipped with a graphite heat-generating tube having an inner diameter of 50 mm, heated from room temperature to 1000° C. over a time of 30 minutes, and then to 2400° C. over a time of 42 minutes. After it reached 2400° C., the furnace temperature was maintained at 2400° C. for one minute, and then cooled to 1700° C. over a time of 4 minutes. Further, the furnace was cooled to room temperature over a time of 2 hours, and then the cooled fibers were removed from the furnace. The above-mentioned heat treatment was carried out while passing an argon gas (having a degree of purity of 99.9% by volume) at a flow rate of 2.0 liters/minute through the furnace. The resultant heat treated fibers had a weight of 0.75 g.

As a result of a scanning electron microscopic observation of the peripheral surfaces and cross-sections of the heat-treated silicon carbide fibers, it was confirmed that all of the resultant fibers were significantly damaged.

Example 2

Silicon carbide fibers were produced by the same procedures as in Example 1.

The resultant silicon carbide fibers in an amount of 1.00 g were immersed in 100 g of a dispersion of 1.5 g of boron carbide (reagent grade, amorphous, made by WAKO JUNYAKUKOGYO K.K.) in 98.5 g of methyl alcohol for 5 minutes, and removed from the dispersion and filtered by a Buchner funnel under suction to remove the excessive amount of the dispersion from the fiber. The filtered fibers were dried in an air blast dryer at a temperature of 105° C. for 3 hours. The weight of the dried fibers was 1.11 g.

The boron carbide-impregnated silicon carbide fibers in an amount of 1.00 g were placed in a Tammann furnace equipped with a graphite heat-generating tube having an inner diameter of 50 mm, heated from room temperature to 1000° C. over a time of 30 minutes, and then to 2000° C. over a time of 30 minutes. After reached 2000° C., the furnace temperature was maintained at 2000° C. for one minute, and then cooled to 1700° C. over a time of 2 minutes. Further, the furnace temperature was cooled to room temperature over a time of 2 hours, and then the cooled fibers were removed from the furnace. The above-mentioned heat treatment was carried out while passing an argon gas (having a degree of purity of 99.9% by volume) at a flow rate of 2.0 liters/minute through the furnace. The resultant heat treated fibers had a weight of 0.89 g.

As a result of a scanning electron microscopic observation of the cross-sections of the heat-treated silicon carbide fibers, it was confirmed that the resultant fibers had a more dense structure, substantially free from pores, than that of the non-boron-carbide-carrying and non-heat treated silicon carbide fibers, and thus the sintering of silicon carbide occurred.

Example 3

Silicon carbide fibers were produced by the same procedures as in Example 1.

The resultant silicon carbide fibers in an amount of 1.00 g were immersed in 100 g of a dispersion of 2.0 g of lithium borohydride (reagent grade, made by ARDRICH CO.) in 98 g of tetrahydrofuran (super grade reagent, made by WAKO JUNYAKUKOGYO K.K.) for 5 minutes, and removed from the dispersion and filtered by a Buchner funnel under suction to remove the excessive amount of the dispersion from the fiber. The filtered fibers were dried in a vacuum dryer at a temperature of 60° C. for 3 hours. The weight of the dried fibers was 1.15 g.

The silicon carbide fibers carrying thereon lithium borohydride, in an amount of 1.00 g, were placed in a Tammann furnace equipped with a graphite heat-generating tube having an inner diameter of 50 mm, heated from room temperature to 1000° C. over a time of 30 minutes, and then to 2000° C. over a time of 30 minutes. After reached 2000° C., the furnace temperature was maintained at 2000° C. for one minutes, and then cooled to 1700° C. over a time of 2 minutes. Further, the furnace temperature was cooled to room temperature over a time of 2 hours, and then the cooled fibers were removed from the furnace. The above-mentioned heat treatment was carried out while passing an argon gas (having a degree of purity of 99.9% by volume) at a flow rate of 2.0 liters/minute through the furnace. The resultant heat treated fibers had a weight of 0.90 g.

As a result of a scanning electron microscopic observation of the cross-sections of the heat-treated silicon carbide fibers, it was confirmed that the resultant fibers had a more dense structure, substantially free from pores, than that of the non-boron compound carrying and non-heat treated silicon carbide fibers and thus the sintering of silicon carbide occurred.

Example 4

Silicon carbide fibers were produced by the same procedures as in Example 1, and boron was carried on the silicon carbide fibers by the same procedures as in Example 1.

The boron-carrying silicon carbide fibers in an amount of 1.00 g were placed in a Tammann furnace equipped with a graphite heat-generating tube having an inner diameter of 50 mm, heated from room temperature to 1000° C. over a time of 30 minutes, and then to 2000° C. over a time of 30 minutes. After it reached 2000° C., the furnace temperature was maintained at 2000° C. for one minute, and then cooled to 1700° C. over a time of 3 minutes. Further, the furnace temperature was cooled to room temperature over a time of 2 hours, and then the cooled fibers were removed from the furnace. The above-mentioned heat treatment was carried out while passing an helium gas (having a degree of purity of 99.9% by volume) at a flow rate of 2.0 liters/minute through the furnace. The resultant heat treated fibers had a weight of 0.91 g.

As a result of a scanning electron microscopic observation of the peripheral surfaces and the cross-sections of the heat-treated silicon carbide fibers, it was confirmed that the resultant fibers had a more dense structure, substantially free from pores, than that of the silicon carbide fibers not carrying boron and not heat-treated at 2000° C., and thus the sintering of silicon carbide occurred.

Example 5

Silicon monoxide grains (made by SUMITOMO STICKS K.K.) in an amount of 5 g were spread on a bottom of a graphite box, and then a felt-like sheet (trademark: FELT FT-300, made by KURARAY CHEMICAL CO.) consisting of activated carbon fibers produced from a phenol resin and having a specific surface area of 1000 $m^2/g$, and having a basis weight of 200 $g/m^2$ and dimensions of 50 mm×50 mm, was placed on the silicon monoxide grain layer in the graphite box. The box was closed with a graphite lid. The graphite box was placed in an alumina core tube having an inner capacity of 5 liters and an inner diameter of 70 mm, and contained in a tube-shaped furnace, and the furnace was connected to an oil rotary vacuum pump having a gas-removing capacity of 50 liters/second, to reduce the inner pressure of the core tube. While reducing the inner pressure of the core tube, the furnace temperature was rised from room temperature to 1300° C. over a time of 4 hours. When it reached 1300° C., the furnace temperature was maintained at this level for 2 hours, and then the furnace was cooled to room temperature over a time of 6 hours. Then the resultant felt-like sheet was removed from the furnace. The weight of the resultant sheet was 0.72 g.

The resultant sheet was immersed in 100 g of a dispersion of 1 g of boron in 99 g methyl alcohol for 5 minutes, and removed from the dispersion, and the excessive amount of the dispersion was removed by a blotting paper sheet.

The sheet was dried in an air blast dryer at a temperature of 105° C. for 3 hours. The weight of the dried sheet was 0.76 g.

The dried sheet was placed on a graphite plate and then placed in a Tammann furnace equipped with a graphite heat-generating tube having an inner diameter of 50 mm, heated from room temperature to 1000° C. over a time of 30 minutes, and then to 2000° C. over a time of 30 minutes. After it reached 2000° C., the furnace temperature was maintained at 2000° C. for one minute, and then cooled to 1700° C. over a time of 2 minutes. Further, the furnace temperature was cooled to room temperature over a time of 2 hours, and then the cooled fibers were removed from the furnace. The above-mentioned heat treatment was carried out while passing an argon gas (having a degree of purity of 99.9% by volume) at a flow rate of 2.0 liters/minute through the furnace. The resultant heat treated sheet had a weight of 0.68 g.

As a result of a scanning electron microscopic observation of the cross-sections of the fibers from which the heat treated sheet was formed, it was confirmed that the resultant fibers had a more dense structure, substantially free from pores, than that of the silicon carbide fibers which was carrying boron and not heat-treated at a temperature of 2000° C., and thus the sintering of silicon carbide occurred.

The heat-treated silicon carbide fiber felt-like sheet had a significantly increased mechanical strength in comparison with that of the non-heat treated sheet. Thus, substantially no falling off of the fibers from the sheet due to the breakages of the fibers occurred during handling the sheet.

Example 6

Silicon carbide fibers were produced by the same procedures as in Example 1.

The silicon carbide fibers in an amount of 1.00 g were placed in a Tammann furnace equipped with a graphite heat-generating tube having an inner diameter of 50 mm, heated from room temperature to 1000° C. over a time of 30 minutes, and then to 2000° C. over a time of 30 minutes. After reached 2000° C., the furnace temperature was maintained at 2000° C. for one minute, and then cooled to 1700° C. over a time of 2 minutes. Further, the furnace temperature was cooled to room temperature over a time of 2 hours, and then the cooled fibers were removed from the furnace. During the above-mentioned heat-treatment procedures, a mixed gas of diborane with helium was passed through the furnace at a flow rate of 1.0 liter/minute, and during the cooling procedure, a helium gas was passed through the furnace at a flow rate of 1.0 liter/minute. The diborane-helium mixed gas contained 0.1% by volume of diborane. Also, the helium gas had a degree of purity of 99.9%.

The resultant heat-treated silicon carbide fiber had a weight of 0.95 g.

As a result of a scanning electron microscopic observation of the cross-section of the heat-treated fibers, it was confirmed that the fine structure of the fibers were more dense than that of the non-heat treated fibers, no pores were found on the surface and the cross-sections of the fibers, and thus the sintering of silicon carbide occurred.

Example 7

Silicon carbide fibers were produced by the same procedures as in Example 1.

The resultant silicon carbide fibers in an amount of 1.00 g were immersed in 100 g of a dispersion of 1.0 g of boron and 2 g of carbon black (made by MITSUBISHI CHEMICAL CO.) in 97 g of methyl alcohol for 5 minutes, and removed from the dispersion and filtered by a Buchner funnel under suction to remove the excessive amount of the dispersion from the fiber. The filtered fibers were dried in an air blast dryer at a temperature of 105° C. for 3 hours. The weight of the dried fibers was 1.20 g.

The silicon carbide fibers carrying thereon boron and carbon black were placed in a Tammann furnace equipped with a graphite heat-generating tube having an inner diameter of 50 mm, heated from room temperature to 1000° C. over a time of 30 minutes, and then to 2000° C. over a time of 30 minutes. After reached 2000° C., the furnace temperature was maintained at 2000° C. for one minutes, and then cooled to 1700° C. over a time of 2 minutes. Further, the furnace temperature was cooled to room temperature over a time of 2 hours, and then the cooled fibers were removed from the furnace. The above-mentioned heat treatment was carried out while passing an argon gas (having a degree of purity of 99.9% by volume) at a flow rate of 2.0 liters/minute through the furnace. The resultant heat treated fibers had a weight of 0.88 g.

As a result of a scanning electron microscopic observation of the cross-sections of the heat-treated silicon carbide fibers, it was confirmed that the resultant fibers had a more dense structure, substantially free from pores, than that of the non-boron compound carrying and non-heat treated silicon carbide fibers and thus the sintering of silicon carbide occurred.

Example 8

The same silicon carbide fiber felt-like sheet as in Example 5 were produced in accordance with the procedures described in Example 5.

The silicon carbide fiber sheet in an amount of 0.72 g was immersed in 10 g of a dispersion of 1 g of boron (reagent grade, amorphous, made by WAKO JUNYAKUKOGYO K.K.) and 2.5 g of a phenol resin (water-soluble resin, made by SHOWA KOBUNSHI K.K. in 96.5 g of methyl alcohol, for 5 minutes. Then the sheet was removed from the dispersion, and an excessive amount of the dispersion was removed from the sheet by a blotting paper sheet.

The sheet was dried in an air blast dryer at a temperature of 105° C. for 3 hours. The dried sheet had a weight of 0.82 g.

The boron and phenol resin-carrying sheet placed on a graphite plate was placed in a Tammann furnace equipped with a graphite heat-generating tube having an inner diameter of 50 mm, and heated from room temperature to 1000° C. over a time of 30 minutes, and then to 2000° C. over a time of 30 minutes. After reached 2000° C., the furnace temperature was maintained at this level for one minute and then cooled to 1700° C. over a time of 2 minutes then to room temperature over a time of 2 hours. Then the heat treated sheet was removed from the furnace.

During the heat treating and cooling procedures, an argon gas having a degree of purity of 99.9% by volume was passed through the furnace at a flow rate of 2 liters/minute. The heat treated sheet had a weight of 0.69 g.

When the cross-sections of the heat-treated silicon carbide fibers in the sheet were observed by a scanning electron microscope, it was confirmed that the fine structure of the fibers was more dense than that of the original silicon carbide fibers carrying no boron and phenolic resin and non-heat-treated, and substantially free from pores, and thus the silicon carbide was sintered by the heat-treatment in the presence of boron and the phenol resin.

Also, it was confirmed that the heat treated sheet exhibited a significantly enhanced mechanical strength in comparison with the original silicon carbide fiber sheet. Thus, substantially no falling off of the fibers from the sheet due to breakages of the fibers during handling the sheet was found. The non-heat treated silicon carbide fibers of Example 1 and the heat treated silicon carbide fibers of Examples 1 to 8 and Comparative Examples 1 and 2 were subjected to the following tests.

(1) Resistance to Bend-breakage

A fiber was picked up with a pair of tweezers (pincette) and bent. A resistance of the fiber to the bend-breakage was evaluated under microscopic observation in the following four classes.

| Class | Resistance to bend-breakage |
|---|---|
| 4 | Very strong |
| 3 | Strong |
| 2 | Good |
| 1 | Weak |

(2) Heat Resistance

A mass of silicon carbide fibers was heated in the air atmosphere at a temperature of 1100° C. for 10 hours. The weights of the original and heated silicon carbide fiber masses were determined, and an weight increase of the heated fiber mass was determined in accordance with the following equation.

$$\text{Weight increase } (\%) = [(W_1/W_0) - 1] \cdot 100$$

wherein $W_0$ represents a weight of the original silicon carbide fiber mass, and $W_1$ represents a weight of the heated silicon carbide fiber mass.

The test results are shown in Table 1.

TABLE 1

| Example No. | Item | Resistance to bend-breakage | Heat resistance (Weight increase (%) by heating at 1100° C. in the air) |
|---|---|---|---|
| Control (Non heat-treated fibers) | | 2 | 17.5 |
| Example | 1 | 4 | 0.9 |
| | 2 | 3 | 1.0 |
| | 3 | 3 | 1.0 |
| | 4 | 4 | 0.9 |
| | 5 | 3 | 1.0 |
| | 6 | 3 | 1.0 |
| | 7 | 4 | 0.8 |
| | 8 | 4 | 0.8 |
| Comparative Example | 1 | 2 | 15.0 |
| | 2 | 1 | 0.9 |

Table 1 clearly shows that the silicon carbide fibers produced from activated carbon fibers and heat-treated in the present of a boron-containing substance and optionally a carbon-containing substance in an inert gas atmosphere at a temperature of 1700 to 2300° C., in Example 1 to 4, 6 and 7 in accordance with the process of the present invention, exhibited an excellent mechanical strength and an enhanced heat resistance, in comparison with the non-heat treated silicon carbide fibers shown in Example 1 and with the comparative silicon carbide fibers of Comparative Examples 1 and 2 wherein the silicon carbide fibers were heat treated by a process differed from that of the present invention. In view of the results, it is assumed that the specific heat treatment in accordance with the process of the present invention causes the silicon carbide particles from which the silicon carbide fibers are formed to be sintered so as to enhance the density of the fibers, and the silicon carbide particles to be bonded with each other so as to decrease the defects of the fibers which causes, when a stress is applied to the fibers, the fibers to start to break down.

Also, the heat resistance of the silicon carbide fibers produced from the activated carbon fibers can be significantly enhanced by the heat treatment in accordance with the process of the present invention. This advantage of the present invention is clearly illustrated by the comparison, in the weight increase by heating in air at 1100° C. for 10 hours, of the heat resistance of the heat treated silicon carbide fibers of Examples 1 to 4, 6 and 7 with that of the non-heat treated silicon carbide fibers and the comparative heat-treated silicon carbide fibers of Comparative Examples 1 and 2. Namely, the heat treatment of the silicon carbide fibers in accordance with the process of the present invention advantageously causes the silicon carbide particles from which the silicon carbide fibers are constituted, to be sintered and thus oxidation of the silicon carbide fibers with oxygen in air to be prevented.

In view of Examples 5 and 8, the process of the present invention can be applied to the activated carbon fibers formed into a formed article, for example, sheet (felt-like sheet, and three dimensional articles, for example, a honeycomb structure. Namely, the process of the present invention is applicable to a wide range of uses.

What is claimed is:

1. A process for producing silicon carbide fibers comprising the steps of:

reacting activated carbon fibers having a fiber thickness of 1 to 30 $\mu$m and a specific surface area of 700 to 1500 m$^2$/g determined by a BET nitrogen absorption method, with a gas comprising at least one member selected from the group consisting of silicon and silicon oxides, at a temperature of 1200 to 1500° C. under a reduced pressure of in an inert gas atmosphere, to convert the activated carbon fibers to silicon carbide fibers;

applying boron to the silicon carbide fibers, to cause the boron to be carried on the silicon carbide fibers; and then heat-treating the silicon carbide fibers carrying thereon boron at a temperature of 1900 to 2300° C. in an inert gas atmosphere, to enhance the mechanical strength and heat resistance of the silicon carbide fibers.

2. The process for producing silicon carbide fibers as claimed in claim 1, wherein the boron carried on the silicon carbide fibers is in an amount of 0.1 to 50 parts by weight per 100 parts by weight of the silicon carbide fibers.

3. The process for producing silicon carbide fibers as claimed in claim 1, wherein in the heat-treating step, the boron is gasified.

4. The process for producing silicon carbide fibers as claimed in claim 3, wherein the gasified boron is present in an amount of 0.01 to 1% by volume based on the volume of the inert gas.

5. The process for producing silicon carbide fibers as claimed in claim 1, wherein the inert gas for the reaction step and the heat-treating step respectively and independently from each other comprises at least one member selected from argon, helium and neon.

6. The process for producing silicon carbide fibers as claimed in claim 1, wherein the heat-treating step is carried out in the presence of a carbon-containing substance in addition to boron.

7. The process for producing silicon carbide fibers as claimed in claim 6, wherein the carbon-containing substance comprises at least one member selected from carbon, carbon monoxide, carbon dioxide and other carbon compounds which generate at least one member selected from carbon, carbon monoxide and carbon dioxide by being heated in an inert gas atmosphere.

8. The process for producing silicon carbide fibers as claimed in claim 6, wherein before the heat-treating step, the carbon-containing substance is carried on the silicon carbide fibers.

9. The process for producing silicon carbide fibers as claimed in claim 8, wherein the carbon-containing substance comprises at least one member selected from the group consisting of phenolic resins, carbon lack, cellulose and cellulose derivatives.

10. The process for producing silicon carbide fibers as claimed in claim 8, wherein the carbon-containing containing substance carried on the silicon carbide fibers is in an amount of 0.1 to 10% by weight, in terms of carbon, based on the weight of the silicon carbide fibers.

11. The process for producing silicon carbide fibers as claimed in claim 6, wherein in the heat-treating step, the carbon-containing substance is in the state of a gas.

12. The process for producing silicon carbide fibers as claimed in claim 11, wherein the carbon-containing substance in the state of a gas is present in an amount of 0.01 to 1% by volume, based on the volume of the inert gas.

13. The process for producing silicon carbide fibers as claimed in claim 6, wherein the carbon-containing substance is present in a weight ratio of carbon element contained in the carbon-containing substance to boron of 0.1:1 to 2.0:1.

14. The process for producing silicon carbide fibers as claimed in claim 1, wherein the activated carbon fibers are in the form of a sheet-form structure or a three dimensional structure.

* * * * *